Oct. 22, 1946.   C. M. HINES ET AL   2,409,857
LINEAR GENERATOR
Filed April 15, 1944   2 Sheets-Sheet 1

INVENTORS
CLAUDE M. HINES
JOHN W. RUSH
BY
ATTORNEY

Oct. 22, 1946.   C. M. HINES ET AL   2,409,857
LINEAR GENERATOR
Filed April 15, 1944   2 Sheets-Sheet 2
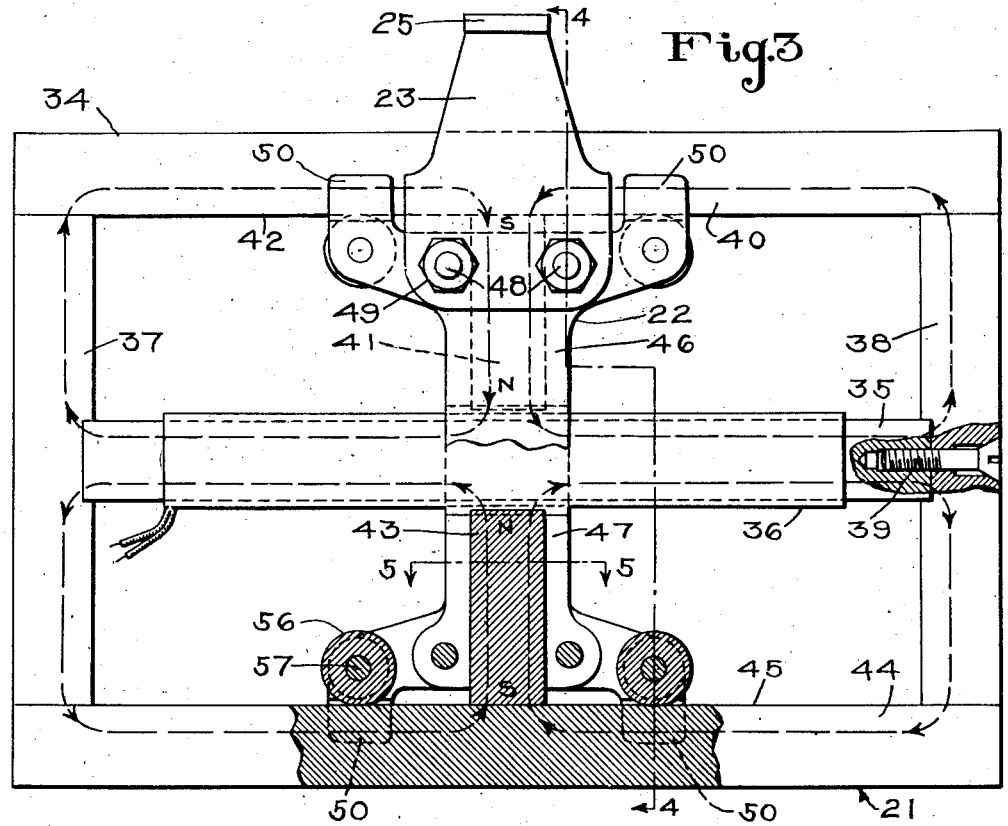
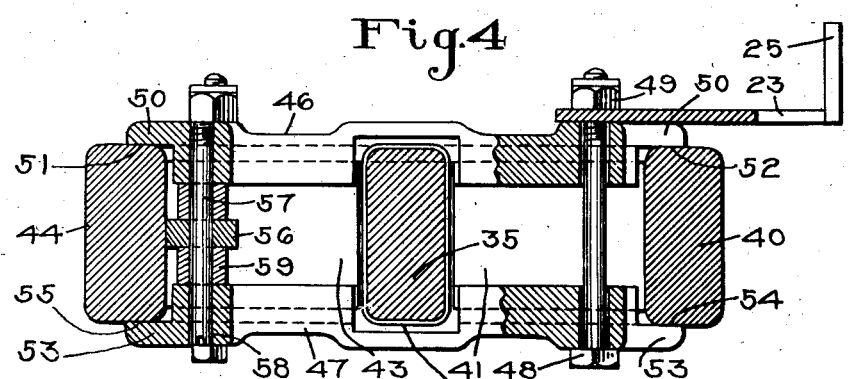
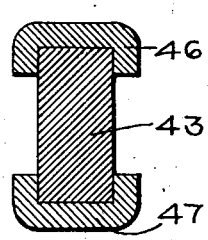
INVENTORS
CLAUDE M. HINES
JOHN W. RUSH
BY
ATTORNEY Patented Oct. 22, 1946

2,409,857

UNITED STATES PATENT OFFICE 2,409,857

LINEAR GENERATOR

Claude M. Hines, Pittsburgh, and John W. Rush, Wilkinsburg, Pa., assignors to The Westinghouse Air Brake Company, Wilmerding, Pa., a corporation of Pennsylvania Application April 15, 1944, Serial No. 531,278

4 Claims. (Cl. 171—209)

This invention relates to speed indicators, and more particularly to a voltage generating apparatus for measuring the rate of linear travel in the feed of a machine tool or the like.

An important factor in the control of industrial production is the accuracy of available information as to the capacity of individual machine tools, useful to an industrial engineer engaged in the preparation of a machine tool analysis. To determine the productive rate of a machine tool, such as a boring mill, it is highly desirable to have means for adequately checking the feed of the machine, or the speed of movement of the work table toward the boring unit in the case of the machine mentioned. The feed of such a machine may approach a rate as low as one inch per minute, however, and it has heretofore been considered impracticable to attempt the construction of a commercial instrument operative to indicate so slow a linear speed.

It is an object of this invention to provide an apparatus of simple and inexpensive construction which may be employed in directly and accurately reading the rate of travel or feed of moving elements on boring mills, lathes and other machine tools.

Another object of the invention is to provide an apparatus of the above type which is operated electrically and may comprise relatively few elements occupying little space.

A further object is to provide an apparatus for indicating rate of travel, the elements of which may be assembled as a permanent fixture in a certain machine tool, or may if preferred be housed in a portable box for occasional use in connection with any one of a number of machine tools.

Other objects and advantages of the invention will appear in the following more detailed description thereof, taken in connection with the accompanying drawings, wherein:

Fig. 3 is a front elevation partly in section of the electric generator portion of the apparatus;

Fig. 4 is a horizontal sectional view of the same taken on the line 4—4 in Fig. 3; and Fig. 5 is a fragmentary horizontal sectional view of the same taken on the line 5—5 in Fig. 3.

Figure 1:
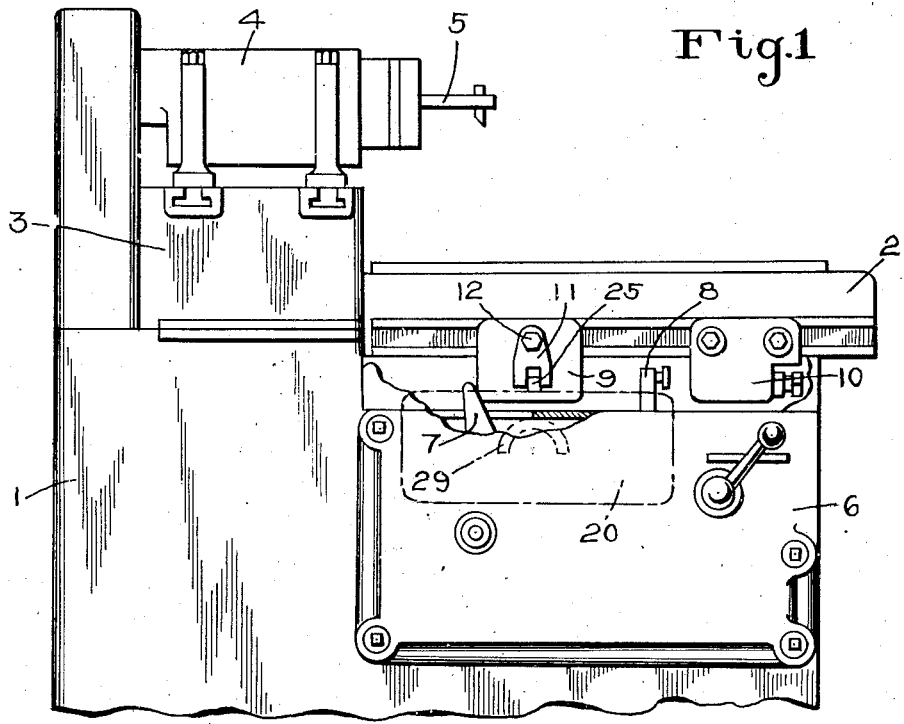
Fig. 1 is an elevational view of a typical boring machine with which this invention may be employed.

The boring machine shown in Fig. 1 is illustrative of one class of machine tools of the slow feed type with which this apparatus is particularly useful, it being understood that the machine as such does not constitute a part of the invention. This boring machine consists of a base structure 1 arranged to contain suitable hydraulic or mechanical means for moving a table 2, which is slidably mounted on the base structure, a boring head bridge 3, and a boring head unit 4 adjustably mounted on the bridge for supporting a motor driven tool 5. A control box 6 is mounted on the base 1 and encloses suitable controlling elements including a speed reduction lever 7 and a stop lever 8, which are arranged to be actuated by a pair of adjustable cam members 9 and 10 bolted to the movable table 2. In order that the feed or linear speed of the table 2 may be readily measured by means of the apparatus about to be described, a U-shaped lug 11 is preferably secured by means of a bolt 12 to the cam member 9.

Figure 2:
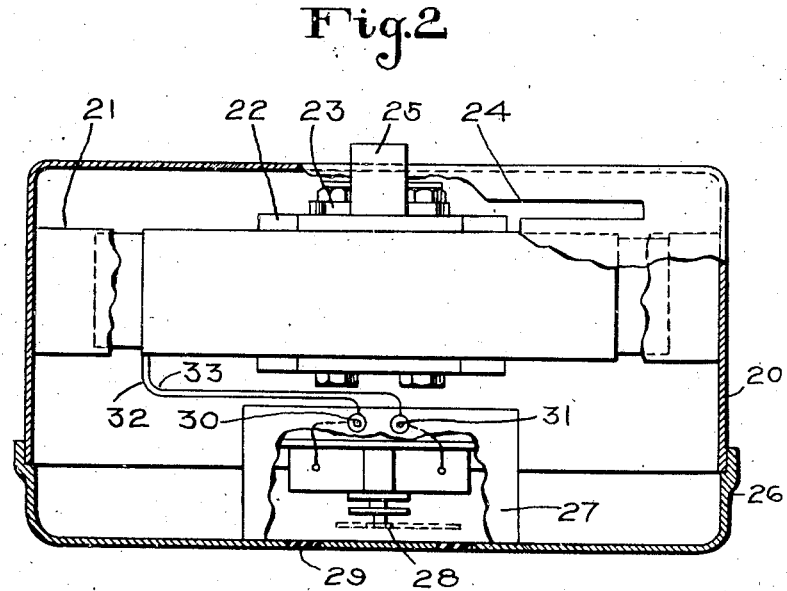
Fig. 2 is a side view chiefly in section of the apparatus embodying the invention with certain parts broken away to show internal construction thereof.

In Fig. 2 of the drawings there is shown a preferred embodiment of the invention completely assembled for use with the machine tool shown in Fig. 1. The apparatus includes a casing structure 20 in which is housed a generator portion 21, the movable member 22 of which portion is provided with an operating arm 23. This arm 23 extends through a slot 24 formed in the casing 20 and terminates in a lug 25 which is turned normal to the arm and shaped so as to be suitable for engagement with the U-shaped lug 11 on the machine shown in Fig. 1.

Mounted on the casing 20 is a cover portion 26 to the inner surface of which is secured by any suitable means, a voltmeter 27, the indicating pointer 28 of which is visible to the exterior through a transparent dial 29 in the face of the cover, which dial may be calibrated in inches per minute or other suitable units of speed. Terminals 30 and 31 of the voltmeter are connected across the output of the generator portion 21 by means of conductors 32 and 33.

Considering now the generator portion 21 more in detail, reference is made to Figs. 3, 4, and 5. The generator portion 21 includes a frame 34 formed in a hollow rectangle of a suitable ferromagnetic material which frame serves as a support for the movable member 22 and also as a keeper or core for the magnetic circuits as will hereinafter more fully appear. Extending longitudinally through the middle of the opening in the frame 34 is a core 35, rectangular in cross-section, of ferromagnetic material, which core is provided with an armature winding 36. This core is secured tightly to the short sides 37 and 38 of the frame by means of screws 39 so that the circuit of the magnetic field in the bar is completed through the frame 34.

Spanning the space between the core 35 and a long side 40 of the frame 34 is a permanently magnetized pole piece 41, the south pole end of which slidably engages a finished surface 42 of the side 40. The north pole end of the pole piece 41 is adjacent one side of the core 35 with an intervening space sufficient to clear the winding 36. On the opposite side of the core 35 and directly opposite pole piece 41 a permanently magnetized pole piece 43 spans the space between the core 35 and a long side 44 of the frame 34. A small clearance space is provided between the winding 36 and the north pole end of the pole piece 43. The south pole end of this piece slidably engages a finished surface 45 of the side 44.

From the above description it will be seen that four magnetic circuits are thus established about the four openings within the frame 34, there being two at the right and two at the left of the line of the pole pieces 41 and 43, or in other words, two above and two below the core 35, as indicated by the dash lines in Fig. 3. A typical circuit is indicated in the upper left-hand corner of frame 34 in Fig. 3. Starting at the north pole of pole piece 41 this magnetic circuit follows the side of core 35 at the left of piece 43, traverses the upper half of side 37, and reaches the south pole end of piece 41 by way of the side 40 at the left of said pole piece.

Supporting and guiding these pole pieces 41 and 43 are a base plate 46 and a counter plate 47 which are held in clamping relationship therewith by means of bolts 48 and nuts 49, the plate 46 being provided with guide lugs 50 which slidably engage a finished surface 51 of side 44 and a finished surface 52 of side 40, and the counter plate 47 being provided with guide lugs 53, similar guide lugs 53 for slidably engaging a finished surface 54 of side 40 and a finished surface 55 of side 44.

For limiting the movement of the pole pieces in the direction of their length and thus preventing the pole pieces from abrading the winding 36, rollers 56 are rotatably mounted on pins 57 which are mounted by screw-threaded means in the plate 46 and poised in bores 58 in the plate 47. Bushings 59 are mounted on pins 57 at each side of each roller 56 to prevent shifting of the rollers in an axial direction.

When it is desired to use the apparatus, the lug 25 may be inserted in the opening in the lug 11 carried by the table 2 of the machine tool shown in Fig. 1, while the casing 20 may be supported in the hands of the operator in the position in which it is shown in Fig. 1, or on a suitable support associated with the apparatus and not illustrated.

Assuming that the lug 25 is disposed at the right-hand end of the slot 24 as viewed in Fig. 2, when the machine tool in Fig. 1 is set in operation, the table 2 thereof will move to the left causing the movable member 22 to move to the left as viewed in Figs. 2 and 3.

With the member 22 moving to the left as viewed in Fig. 3, the shifting magnetic flux carried between the pole pieces 41 and 43 will induce a flow of current in a counterclockwise direction in each coil of the winding 36 as viewed in Fig. 4 as that coil cuts the lines of force between the pole pieces. Obviously, the voltage of this induced current will increase as the speed with which the lines of force are cut increases and will be indicative of the speed with which the table 2 of the boring machine shown in Fig. 1 moves.

The current thus induced is delivered from the winding 36 to the terminal 31 of the voltmeter 27 by the conductor 33 and returned from terminal 30 of the voltmeter to the winding by conductor 32. The indicating pointer 28 will be deflected out of central position in a direction corresponding to the direction of current flow and in proportion to the voltage of said current. With suitable calibrations on the dial 29 the speed of the table 2 may be read directly from the dial 29.

While we have disclosed only one specific embodiment of the apparatus constituting our invention, it will be understood that various omissions, additions or modifications may be made therein without departing from the spirit of our invention.

Having now described our invention, what we claim as new and desire to secure by Letters Patent, is:

1. An apparatus adapted to be associated with a linearly movable element of a machine for providing an electrical characteristic corresponding to the speed of movement of the element, said apparatus comprising a closed ferromagnetic core having three parallel-extending legs in spaced relation, a winding carried on the central one of said three legs, a carriage member associated with said core adapted to be moved by the linear movement of the movable element in a straight line parallel to the said legs, a pair of permanent magnets of the bar type carried by said carriage member in substantially perpendicular relation to the said legs, said magnets being effective to provide shiftable magnetic flux linked to said coil and effective upon the movement of the carriage member to cause induction of an electrical characteristic in said winding corresponding substantially to the speed of movement of the carriage member.

2. An apparatus adapted to be operated by a linearly movable element of a machine for providing an electrical characteristic corresponding to the speed of movement of the movable element, said apparatus comprising a closed ferromagnetic core having three parallel-extending legs in spaced relation, a winding carried on the central one of said three legs, a carriage member slidably mounted on said core for movement by the movable element in a straight line parallel to the said legs, a pair of permanent magnets of the bar type carried by said carriage member in substantially perpendicular relation to the said legs, said magnets being effective to provide shiftable magnetic flux linked to said coil and effective upon the movement of the carriage member to cause induction of an electrical characteristic in said winding corresponding substantially to the speed of movement of the carriage member.

3. An apparatus adapted to be operated by a linearly movable element of a machine for providing an electrical characteristic corresponding to the speed of movement of the movable element, said apparatus comprising a closed ferromagnetic core having three parallel-extending legs in spaced relation, a winding carried on the central one of the said three legs, a carriage member slidably mounted on said core for movement by the movable element in a straight line parallel to the said legs, a pair of permanent magnets of the bar type carried by said carriage member in perpendicular relation to the said legs so as to have their like poles facing opposite sides of said winding, said magnets being effective to provide shiftable magnetic flux linked to said coil and effective upon the movement of the carriage member to cause induction of an electrical characteristic in said winding corresponding substantially to the speed of movement of the carriage member.

4. An apparatus adapted to be operated by a linearly movable element of a machine for providing an electrical characteristic corresponding to the speed of movement of the movable element, said apparatus comprising a closed ferromagnetic core having three parallel-extending legs in spaced relation, a winding carried on the central one of said three legs, a carriage member slidably mounted on said core for movement by the movable element in a straight line parallel to the said legs, a pair of permanent magnets of the bar type carried in perpendicular relation to the said legs by said carriage member with two like poles opposite each other across said winding and the opposite like poles slidably engaging the outer legs of the said three legs, said magnets being effective to provide shiftable magnetic flux linked to said coil and effective upon movement of the carriage member to cause induction of an electrical characteristic in said winding corresponding substantially to the speed of movement of the carriage member.

CLAUDE M. HINES.
JOHN W. RUSH.